United States Patent [19]

Bostelmann

[11] Patent Number: 5,797,816
[45] Date of Patent: Aug. 25, 1998

[54] VARIABLE RATIO DRIVE PULLEY WITH DAMPING STRUCTURE

[75] Inventor: Willy Bostelmann, Wels, Austria

[73] Assignee: Bombardier Inc., Canada

[21] Appl. No.: 551,291

[22] Filed: Oct. 31, 1995

[51] Int. Cl.⁶ .............................. F16H 59/00; F16H 61/00
[52] U.S. Cl. ............................. 474/14; 474/94; 74/573 R
[58] Field of Search .................... 474/8, 13, 14, 474/43, 94, 273; 74/573 R, 574; 267/141, 141.1, 153

[56] References Cited

U.S. PATENT DOCUMENTS

| | | |
|---|---|---|
| 3,230,787 | 1/1966 | Siegal. |
| 3,597,987 | 8/1971 | Kiekhaefer. |
| 3,727,478 | 4/1973 | Erickson et al.. |
| 3,733,918 | 5/1973 | Domaas. |
| 3,759,111 | 9/1973 | Hoff. |
| 3,777,583 | 12/1973 | Talbot. |
| 3,939,720 | 2/1976 | Aaen et al.. |
| 3,971,263 | 7/1976 | Beaudoin et al.. |
| 3,986,406 | 10/1976 | Prasad. |
| 4,016,771 | 4/1977 | Berens et al. .................. 74/230.17 M |
| 4,027,544 | 6/1977 | Kobayashi. |
| 4,052,908 | 10/1977 | Takagi et al.. |
| 4,095,479 | 6/1978 | Lundberg. |
| 4,242,921 | 1/1981 | Bremer, Jr.. |
| 4,313,728 | 2/1982 | Prasad. |
| 4,432,743 | 2/1984 | Pitoiset. |
| 4,486,183 | 12/1984 | Posiviata et al.. |
| 4,575,363 | 3/1986 | Burgess et al. ........................... 474/14 |
| 4,710,152 | 12/1987 | Ichikawa et al.. |
| 4,781,659 | 11/1988 | Gebhardt. |
| 5,326,330 | 7/1994 | Bostelmann ............................... 474/13 |
| 5,441,456 | 8/1995 | Watanabe ................................ 474/94 |

FOREIGN PATENT DOCUMENTS

| | | |
|---|---|---|
| 320769 | of 1932 | Canada. |
| 985931 | 3/1976 | Canada. |
| 1112079 | 11/1981 | Canada. |
| 1305498 | 7/1992 | Canada. |

Primary Examiner—Roger J. Schoeppel
Attorney, Agent, or Firm—Larson & Taylor

[57] ABSTRACT

A variable ratio drive pulley of the type employed in snowmobiles to transmit a drive from the snowmobile engine to a variable ratio belt drive transmission has a fixed flange and an opposed movable flange which cooperate to drive the belt. The drive pulley is coupled to rotate with the engine crankshaft and the movable flange incorporates a centrifugal means that operates to advance it towards the fixed flange, with a force that increases with speed of rotation, to grip the transmission belt between the flanges and apply a driving torque thereto, this torque being applied by both the flanges. To reduce the effects of engine induced vibrations on the centrifugal means and on the movable flange, a damping structure is incorporated in the torque path between the engine crankshaft and the centrifugal means and movable flange.

11 Claims, 4 Drawing Sheets

VARIABLE RATIO DRIVE PULLEY WITH DAMPING STRUCTURE

BACKGROUND OF THE INVENTION (a) Field of the Invention

This invention relates to a new or improved variable ratio drive pulley or clutch for the transmission of a driving torque to a flexible drive belt, particularly although not exclusively to such a pulley for use in a snowmobile drive transmission.

(b) Description of the Prior Art

U.S. Pat. No. 4,575,363 Burgess et al., the disclosure of which is herein incorporated by reference, describes a drive pulley as utilized in a snowmobile transmission, the drive pulley incorporating a hollow shaft which supports a fixed frusto-conical flange and an opposed axially movable frusto-conical flange, the latter being urged axially away from the fixed flange by a coiled spring and incorporating an arrangement of centrifugally actuated weighted levers and cams which upon rotation of the pulley generate an axial thrust force on the movable flange towards the fixed flange, that thrust force increasing with speed of rotation to move the flange to grip a drive belt between the pair of flanges and apply a driving torque thereto, the radius of engagement and hence the drive ratio of the belt transmission increasing with speed of rotation as the flanges are forced more closely together. The weighted levers are pivoted on the movable flange and have free ends that carry rollers which engage cam surfaces on ramp elements that are supported on a part that is fixed relative to the hollow shaft. An adjusting arrangement is provided for varying the attitude of the ramp elements so that the thrust force of the drive pulley can be adjusted.

A drive pulley of the type discussed above, otherwise described as a clutch, is generally coupled directly to the crankshaft of the engine and thus is subjected to engine induced vibrations at both pulley flanges. In particular, the drive pulley of a snowmobile transmission is commonly mounted directly to the crankshaft of a high specific horsepower two-stroke engine and may be subjected to a very high level of vibration both bending and torsional, emanating from the engine crankshaft. This can be deleterious both to the force generating means and to the drive belt itself. Indeed it is common for drive pulleys of this kind used in snowmobiles to experience wear in the load mechanism or force generating means. This wear is caused mainly by torsional vibration, and to maintain optimum performance of the system it may be necessary to replace various components of the mechanism periodically. This may be true even in respect of the drive pulley as described in the above mentioned U.S. Pat. No. 4,575,363, since although the design of that drive pulley is very good with respect to wear resistance under high levels of torsional vibration, the constantly increasing power outputs of snowmobile engines applies additional loading stresses to the components so that there is a need to improve the resistance of drive pulleys to engine induced vibrations.

SUMMARY OF THE INVENTION

The invention accordingly provides a variable ratio drive pulley for the transmission of a driving torque to a flexible drive belt, said driving pulley comprising: two coaxial opposed frusto-conical flanges for engagement of the drive belt therebetween, a first said flange being a fixed flange that is arranged to be fixed to rotate with an input shaft, the second said flange being a movable flange that is constrained to rotate with said fixed flange and is guided to move axially with respect to said fixed flange; said movable flange being connected to speed responsive means that is operative to urge it towards said fixed flange against a spring resistance with a force that increases with the rotational speed of said pulley; torque transmitting means for transmitting driving torque from the input shaft to said movable flange; and a damping structure separating the input shaft from said speed responsive means and from said torque transmitting means, said damping structure being constructed and arranged to isolate said speed responsive means and said torque transmitting means from vibrations carried by the input shaft.

The movable flange is preferably guided for axial movement on an axially extending hollow input shaft or sleeve, the fixed flange being attached to the sleeve, and the opposite end of said sleeve carrying an attachment means that is coupled to the speed responsive means and to the torque transmitting means through the damping structure. In this way, the effects of engine induced vibrations are absorbed and dampened, which protects the speed responsive means from exposure to such vibrations and also reduces transmission of vibrations to the belt from the movable pulley flange.

The structure may include a plate element that is adapted to be fixedly attached to the end of the sleeve, this plate element carrying the damping structure in the form of a flat ring of damping material that is bonded and sandwiched between that plate and an opposed ring which is fixed to a cup shaped governor housing through which torque is transmitted to the movable flange.

BRIEF DESCRIPTION OF THE DRAWINGS

The invention will further be described, by way of example only, with reference to the accompanying drawings wherein.

Figure 1:
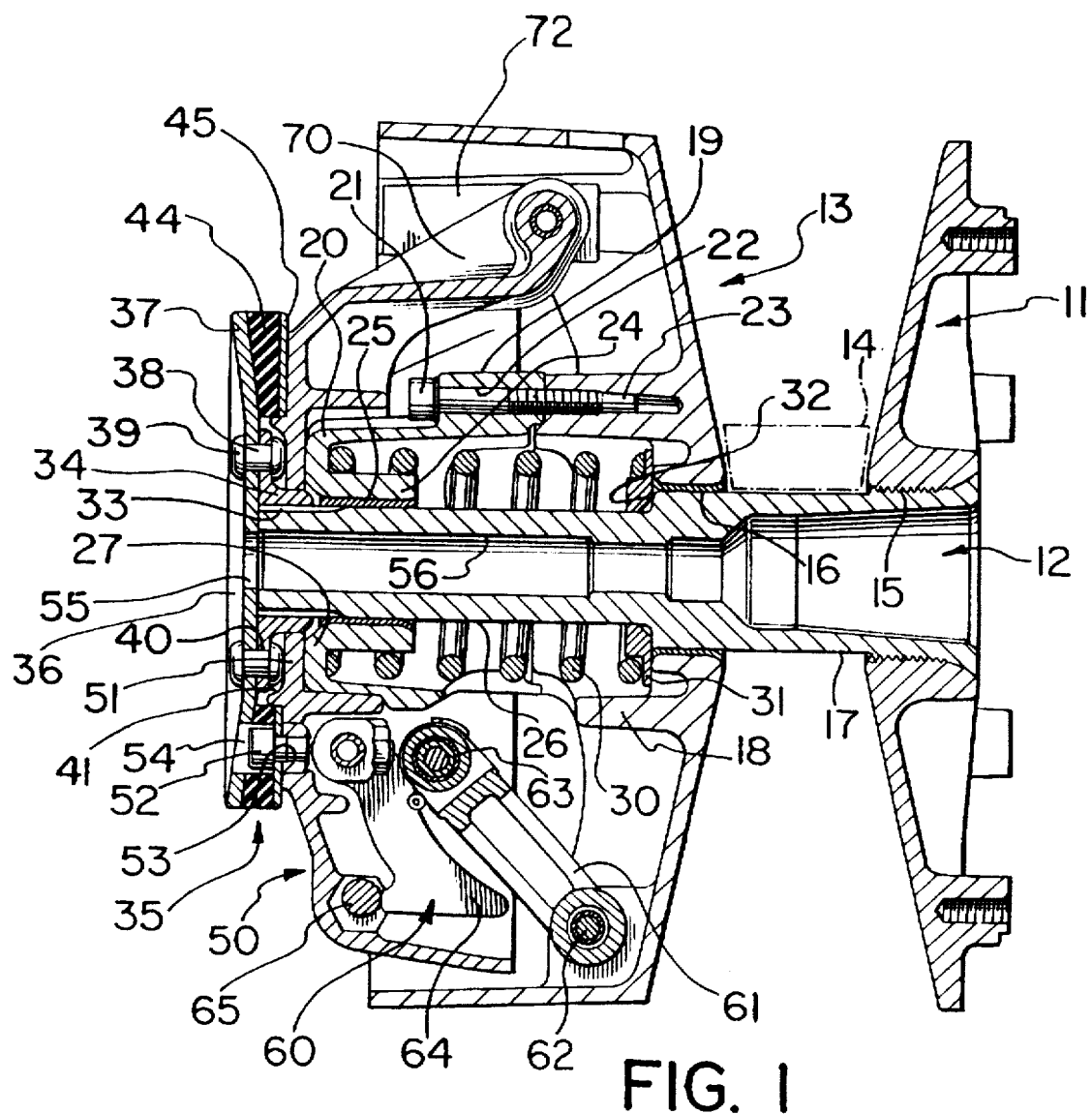
FIG. 1 is a longitudinal axial section view of the drive pulley in accordance with the invention.

The drive pulley comprises a frusto-conical fixed flange 11 secured to a hollow axially extending sleeve 12 and an opposed movable frusto-conical flange 13 which is guided to move axially on the sleeve 12 towards and away from the fixed flange to cooperate therewith in applying a driving torque to an endless flexible drive belt that is indicated in broken lines at 14. Whereas the fixed flange 11 is secured to rotate with the sleeve 12 as by means of an interengaging threaded connection 15, the movable flange 12 is guided for movement axially of the sleeve 12 by means of a tubular bushing 16 which engages a cylindrical outer surface 17 of the sleeve and is slidable thereon.

On the rear side of the movable flange 13 is an axially projecting cylindrical wall 18 which registers with a similar wall 19 of an annular cap 20. The cap is detachably secured to the cylindrical wall 18 by a series of equiangularly spaced bolts 21 (only one is shown) which pass through cylindrical bores 22 in the wall 19 and are in screwthreaded engagement with aligned tapped holes 23 in the cylindrical wall 18. The cap 20 has a re-entrant inner cylindrical wall 24 which carries a cylindrical bushing 25 that is in sliding engagement with a reduced diameter cylindrical surface portion 26 of the sleeve 12.

As will be seen, the wall 18 and the cap 20 together define an annular enclosure surrounding the sleeve, and within this enclosure is disposed a cylindrical coiled compression spring 30 one end of which presses against an end wall 27 of the cap 20 and the opposite end of which presses against an annular seating ring 31 that is engaged against a shoulder 32 formed between the cylindrical surface sections 17 and 26 of the sleeve 12. From the foregoing it will be appreciated that the compressive force of the spring 30 acts through the cap 20 to urge the movable flange 13 axially away from the fixed flange 11.

The sleeve 12 has an axially splined section 33 at its end, this section being engaged by a splined torque flange 34 that forms parts of a damping assembly 35. The latter comprises a circular plate 36 having an annular dished outer ring 37 surrounding a series of equiangularly spaced holes 38 which receive rivets 39 passed through registering holes 40 In an annular flange 41 of the splined torque flange 34 to secure the plate 36 to the latter. An annular ring 44 of resilient vibration-absorbing material such as natural or synthetic rubber is bonded on one side to the dished ring 37 of the plate 36 and on the other side is bonded to a flat annular ring 45.

Figure 2:
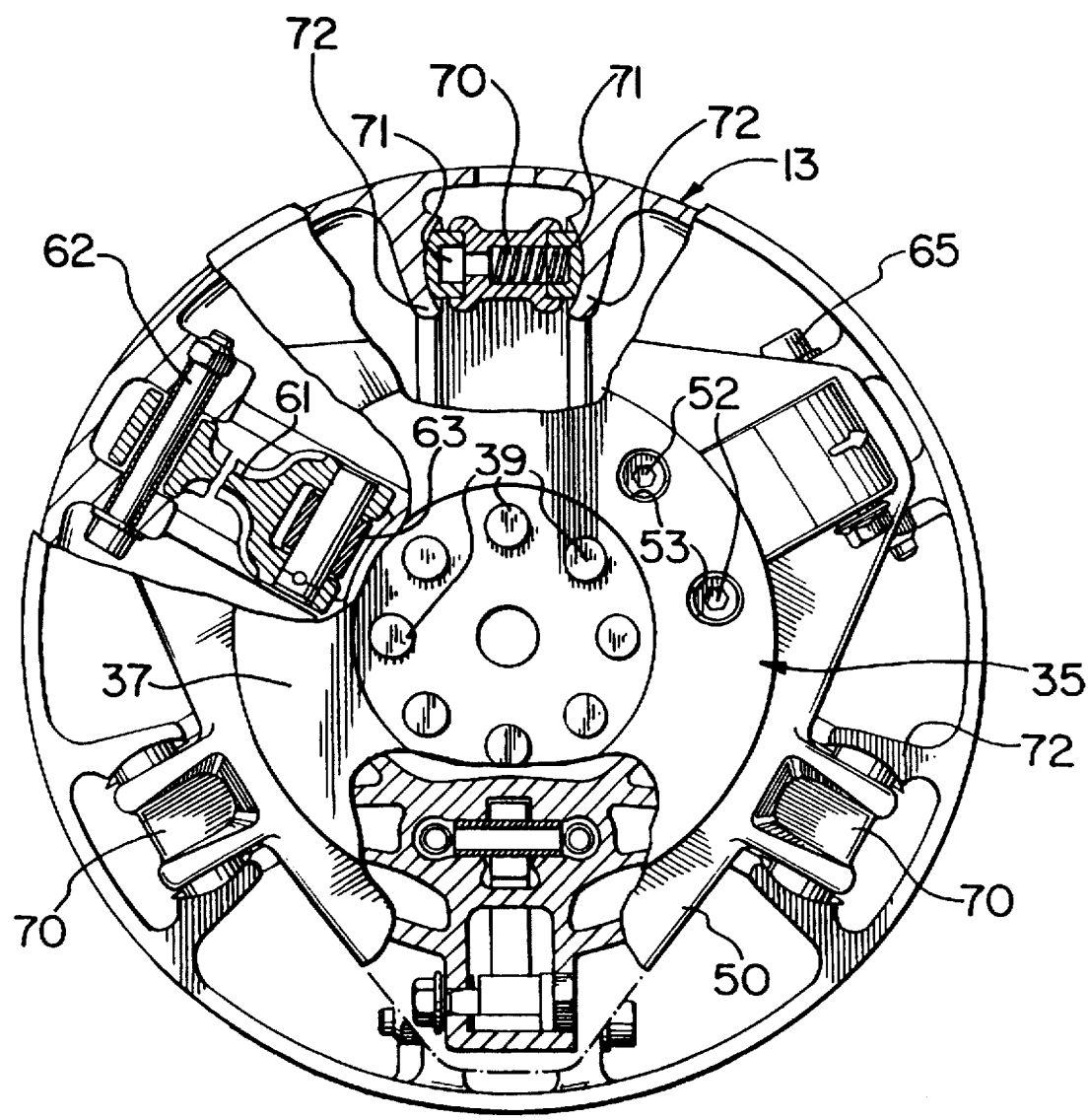
FIG. 2 is an elevational view of the drive pulley taken from he left hand end of FIG. 1 and partially sectioned to show some details of the internal structure.
Figure 3:
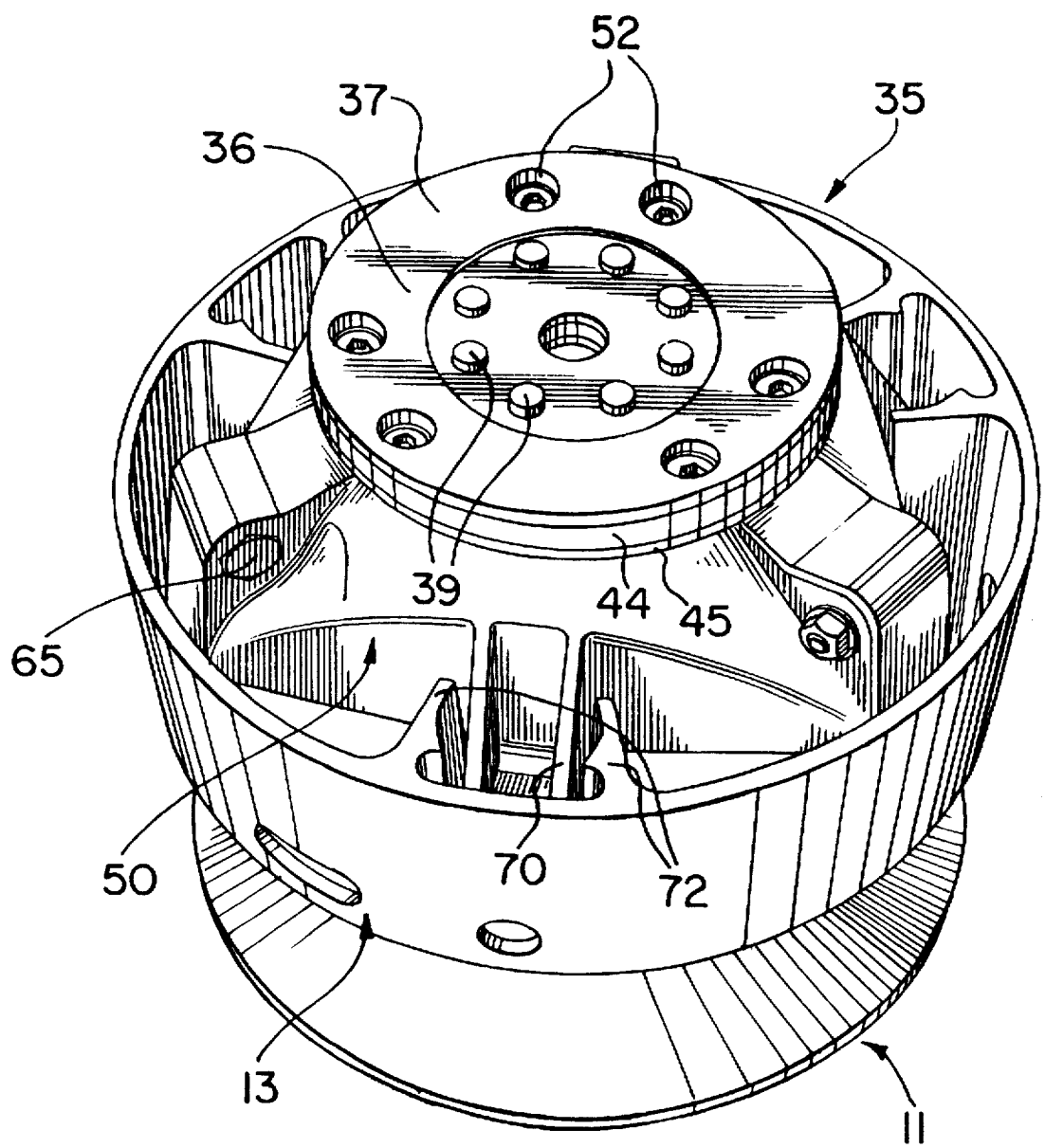
FIG. 3 is a perspective view showing the external appearance of the drive pulley taken from the left hand end in FIG. 1

A governor cup 50 has an annular end wall 51 that is positioned between the end wall 27 of the cap 20 and the damping assembly 35. The latter is secured to the end wall 51 by three pairs of short capscrews 52 which pass through holes in the annular ring 45 and engaged threaded bores in the end wall 53, the heads of the cap screws being received in registering apertures in the dished ring 54 and in the rubber ring 44 as seen in FIGS. 1 and 2.

In use, the drive pulley is secured to the end of the engine crankshaft by an elongate bolt (not shown) which passes through a central hole 55 in the plate 36 and the cylindrical bore 56 of the sleeve 12 to clamp the damping assembly 35 (and hence the governor cup 50) fixedly in relation to the end of the sleeve 12.

Displacement of the movable flange 13 against the force of the spring 30 towards the fixed flange 11 is effected by a speed responsive centrifugal means generally indicated at 60 and which comprises an arrangement of weighted levers 61 pivoted at their respective outer ends on pins 62 carried in the movable flange 13 and having weighted rollers 63 at their opposite ends. Each roller engages the profiled surface of a ramp element 64 carried in the cup 50. As will be appreciated, the centrifugal force created by rotation of the pulley will produce an inter-reaction between the weighted levers and the ramp elements which will produce a resultant force that urges the movable flange 13 axially towards the fixed flange 11, and when this force is of a magnitude sufficient to overcome the force of the coiled spring 30, it will displace the movable flange in this direction. The thrust force of the pulley will vary according to the selected geometry of the parts, and can be changed somewhat by means of an adjustment mechanism 65 through which the attitude of the ramp element 64 can be varied. The arrangement of the weighted levers, ramp elements 64 and adjustment mechanisms 65 is not described in any detail herein since that structure is fully described in the above mentioned U.S. Pat. No. 4,575,363 Burgess et al.

Driving torque is transmitted to the movable flange 13 from the governor cup 50 by means of three axially and radially projecting arms 70 on the latter, the arms carrying spring loaded tangentially extending plastic slider shoes 71 that engage against opposed parallel pairs of axially extending convex walls 72 formed integrally with the movable flange 13.

Accordingly it will be seen that during axial displacement, the movable flange 13 is maintained in angular registry with the sleeve 12 (and consequently with the engine crankshaft) by means of the interengagement of the walls 72 with the slider shoes on the arms 70 of the governor cup, and is maintained in axial alignment with the sleeve 12 by means of the spaced bushings 16 and 25.

Figure 4:
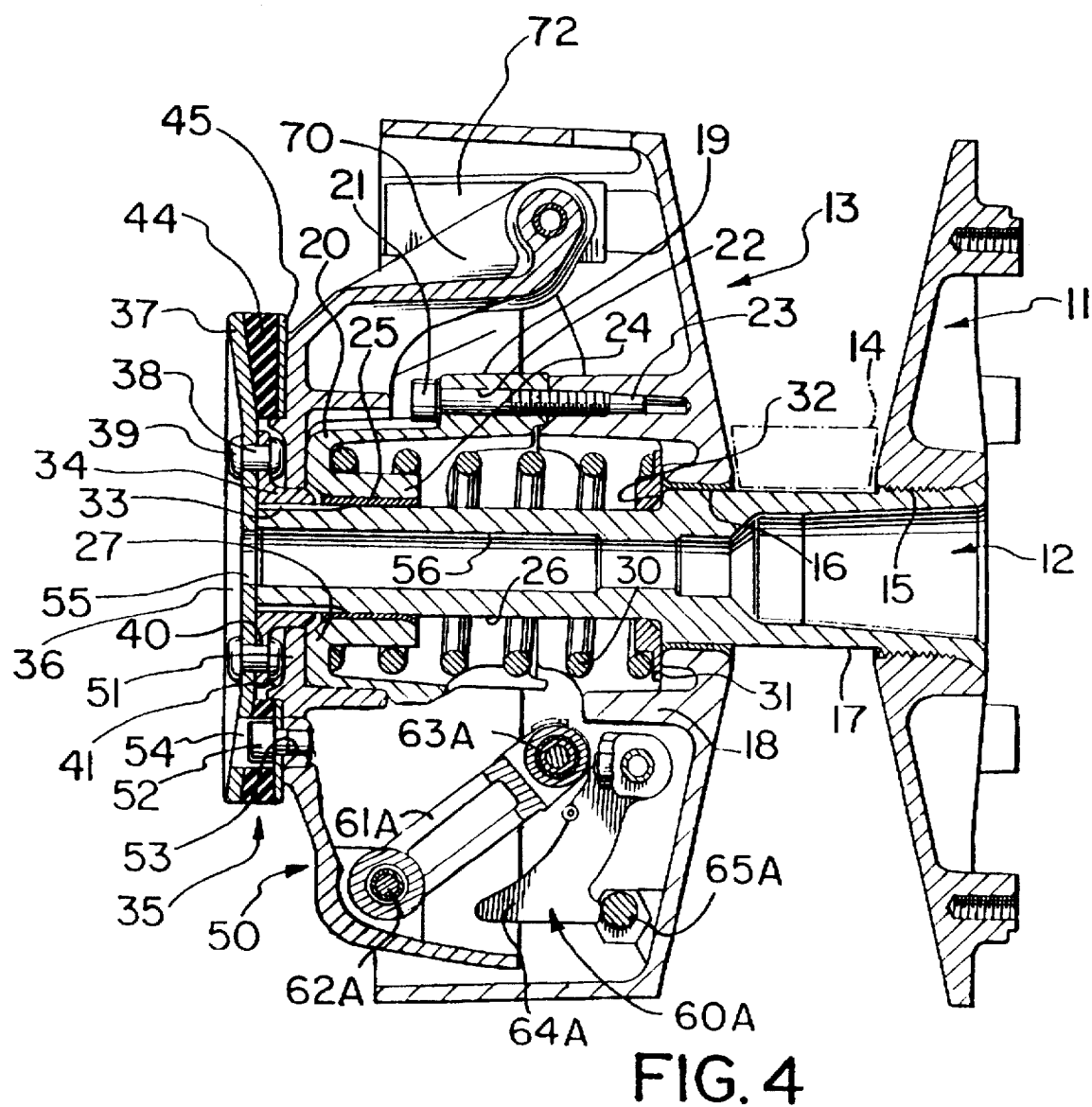
FIG. 4 is a view corresponding to FIG. 1 showing an alternative embodiment.

The alternative arrangement shown in FIG. 4 involves a reversal of the positions of the weighted levers and the ramp elements. Thus, referring to FIG. 4, the weighted lever 61A is pivoted at its outer end on a pin 62A carried in the cup 60. The opposite end of the lever 61A carries a weighted roller 63A which cooperates with a ramp element 64A carried by the movable flange 13. In operation, the performance of the centrifugal means 60A of FIG. 4 is similar to that of the arrangement shown in FIG. 1, and the angle of the ramp element 60A can likewise be adjusted through an adjustment mechanism 65A.

The damping assembly 35 acts to isolate the movable flange 13 and all of the components associated therewith including the bushings 16 and 25, the centrifugal means 60, and the adjustment mechanism 65 from the effects of torsional vibrations generated on the engine crankshaft. These vibrations are particularly troublesome in high output two-stroke engines of the type commonly used in recreational vehicles such as snowmobiles. The damping assembly 35 improves the performance and reliability of such products while enabling them to operate more quietly.

Testing has shown that the service life of a snowmobile drive pulley or clutch as disclosed in U.S. Pat. No. 4,575,363 can be drastically improved by the addition of the damping assembly 35 as described above. In some tests it was found that the service life of the drive pulley was increased by as much as a factor of five before maintenance was required.

A further major benefit of the use of the vibration damper is the significant noise reduction that is achieved. Various elements of the drive pulley mechanism involve metal-to-metal contact and there will usually be sufficient clearance between components that when the drive pulley is subjected to vibrations, rattling and hammering noises can be generated. However these noises are very much reduced by the incorporation of the damping assembly 35 since the latter more or less completely attenuates vibrations transmitted through the movable components.

What I claim as my invention is:

1. A variable ratio drive pulley for the transmission of a driving torque to a flexible drive belt, said driving pulley comprising:

two coaxial opposed frustoconical flanges for engagement of the drive belt therebetween, a first said flange being a fixed flange that is arranged to be fixed to rotate with an input shaft, the second said flange being a movable flange that is constrained to rotate with said fixed flange and is guided to move axially with respect to said fixed flange;

said movable flange being connected to speed responsive means that is operative to urge It towards said fixed flange against a spring resistance with a force that increases with the rotational speed of said pulley;

torque transmitting means for transmitting driving torque from the input shaft to said movable flange; and a damping structure separating the input shaft from said speed responsive means and from said torque transmitting means, said damping structure being interposed to deliver torque between said input shaft and said torque transmitting means during operation of said drive pulley, said damping structure being constructed and arranged to isolate said speed responsive means and said torque transmitting means from vibrations carried by the input shaft.

2. A variable ratio drive pulley as claimed in claim 1 wherein said movable flange is guided for axial movement on said input shaft, said input shaft is fixed at one end to said fixed flange, said input shaft having affixed thereto an attachment means that is coupled to said speed responsive means and to said torque transmitting means through said damping structure.

3. A variable ratio drive pulley as claimed in claim 2 wherein said attachment means comprises a first member that is connected to rotate with said input shaft, a second member in spaced registering relationship with said first member, said damping structure comprising a body of resilient damping material interposed between and bonded to both of said members, said second member being coupled to a retainer which carries said torque transmitting means and said speed responsive means.

4. A variable ratio drive pulley as claimed in claim 3 wherein said attachment means is connected to the second end of said input shaft, said first and second members comprising annular plates positioned on opposite sides of and bonded to said resilient body, one said plate being coupled to said input shaft and the other said plate being coupled to a cup member which constitutes said retainer.

5. A variable ratio drive pulley as claimed in claim 3 wherein said torque transmitting means comprises a plurality of radially extending arms equiangularly arranged about the rotational axis of said input shaft, each said arm forming a driving engagement with a part attached to said movable flange, each said part being axially slidable together with said movable flange relative to said arm.

6. A drive pulley as claimed in claim 3 wherein said speed responsive means comprises a plurality of ramps fixedly supported relative to one of said retainer and said movable flange, and a corresponding number of weighted levers pivoted on the other of said retainer and said movable flange and each arranged to engage and interact with a corresponding one of said ramps to generate an axial thrust on said movable flange as a result of centrifugal force generated by rotation of said pulley, both said levers and said ramps being equiangularly spaced around the axis of said pulley.

7. A variable ratio drive pulley as claimed in claim 1 wherein said damping structure is configured and arranged to transmit all of the torque which is transmitted from the input shaft to said movable flange.

8. A variable ratio drive pulley for the transmission of a driving torque to a flexible drive belt, said driving pulley comprising:

two coaxial opposed frusto-conical flanges for engagement of the drive belt therebetween, a first said flange being a fixed flange that is arranged to be fixed to rotate with and is fixed to one end of an input shaft, the second said flange being a movable flange that is constrained to rotate with said fixed flange and is guided on said input shaft to move axially with respect to said fixed flange;

said movable flange being connected to speed responsive means that is operative to urge it towards said fixed flange against a spring resistance with a force that increases with the rotational speed of said pulley;

torque transmitting means for transmitting driving torque from the input shaft to said movable flange;

a damping structure separating the input shaft from sad speed responsive means and from said torque transmitting, means, said damping structure being constructed and arranged to isolate said speed responsive means and said torque transmitting means from vibrations carried by the input shaft; and attachment means coupled to said speed responsive means and to said torque transmitting means through said damping structure, said attachment means comprising a first member that is connected to rotate with said input shaft, a second member in spaced registering relationship with said first member, said damping structure comprising a body of resilient damping material interposed between and bonded to both of said members, said second member being coupled to a retainer which carries said torque transmitting means and said speed responsive means.

9. A variable ratio drive pulley as claimed in claim 8 wherein said attachment means is connected to the second end of said input shaft, said first and second members comprising annular plates positioned on opposite sides of and bonded to said resilient body, one said plate being coupled to said input shaft and the other said plate being coupled to a cup member which constitutes said retainer.

10. A variable ratio drive pulley as claimed in claim 8 wherein said torque transmitting means comprises a plurality of radially extending arms equiangularly arranged about the rotational axis of said input shaft, each said arm forming a driving engagement with a part attached to said movable flange, each said part being axially slidable together with said movable flange relative to said arm.

11. A drive pulley as claimed in claim 8 wherein said speed responsive means comprises a plurality of ramps fixedly supported relative to one of said retainer and said movable flange, and a corresponding number of weighted levers pivoted on the other of said retainer and said movable flange and each arranged to engage and interact with a corresponding one of said ramps to generate an axial thrust on said movable flange as a result of centrifugal force generated by rotation of said pulley, both said levers and said ramps being equiangularly spaced around the axis of said pulley.

* * * * *